US008871827B2

United States Patent
Licht et al.

(10) Patent No.: US 8,871,827 B2
(45) Date of Patent: Oct. 28, 2014

(54) HOTMELT ADHESIVE COMPRISING RADIATION-CROSSLINKABLE POLY(METH)ACRYLATE AND OLIGO(METH)ACRYLATE WITH NONACRYLIC C-C DOUBLE BONDS

(75) Inventors: Ulrike Licht, Mannheim (DE); Dirk Wulff, Schifferstadt (DE); Thomas Christ, Friedelsheim (DE); Ulrich Filges, Neustadt (DE)

(73) Assignee: BASF SE, Ludwigshafen (DE)

( * ) Notice: Subject to any disclaimer, the term of this patent is extended or adjusted under 35 U.S.C. 154(b) by 46 days.

(21) Appl. No.: 13/487,550

(22) Filed: Jun. 4, 2012

(65) Prior Publication Data

US 2012/0315474 A1 Dec. 13, 2012

Related U.S. Application Data

(60) Provisional application No. 61/493,997, filed on Jun. 7, 2011.

(51) Int. Cl.
| | |
|---|---|
| *C08F 20/22* | (2006.01) |
| *B29D 11/00* | (2006.01) |
| *C08F 2/46* | (2006.01) |
| *C08G 61/04* | (2006.01) |
| *C09J 133/10* | (2006.01) |

(52) U.S. Cl.
CPC ............ *C09J 133/10* (2013.01); *C08L 2312/06* (2013.01)
USPC .................... 522/182; 522/178; 522/1; 520/1

(58) Field of Classification Search
USPC ................................... 522/182, 178, 1; 520/1
See application file for complete search history.

(56) References Cited

U.S. PATENT DOCUMENTS

| | | | | |
|---|---|---|---|---|
| 3,660,526 | A * | 5/1972 | Wegemund et al. | 524/853 |
| 5,384,341 | A * | 1/1995 | Itagaki et al. | 522/111 |
| 5,902,836 | A * | 5/1999 | Bennett et al. | 522/8 |
| 7,238,732 | B2 * | 7/2007 | Bamborough et al. | 522/106 |
| 8,034,849 | B2 * | 10/2011 | Murakami et al. | 522/6 |
| 2007/0054088 | A1 * | 3/2007 | Matijasic et al. | 428/123 |

FOREIGN PATENT DOCUMENTS

| | | |
|---|---|---|
| DE | 10 2004 058 070 A1 | 6/2006 |
| EP | 0 246 848 A2 | 11/1987 |
| EP | 0 377 191 A2 | 7/1990 |
| EP | 0 445 641 A1 | 9/1991 |
| EP | 1 213 306 A2 | 6/2002 |
| EP | 1 469 036 A1 | 10/2004 |
| WO | WO 01/23488 A1 | 4/2001 |
| WO | WO 03/066704 A1 | 8/2003 |

OTHER PUBLICATIONS

International Search Report issued Sep. 11, 2012 in PCT/EP2012/060546 with Translation of Category of Cited Documents.

* cited by examiner

*Primary Examiner* — Ling Choi
*Assistant Examiner* — Jessica E Whiteley
(74) *Attorney, Agent, or Firm* — Oblon, Spivak, McClelland, Maier & Neustadt, L.L.P.

(57) ABSTRACT

Described is a radiation-crosslinkable hotmelt adhesive comprising at least one radiation-crosslinkable poly(meth)acrylate formed to an extent of at least 60% by weight of C1 to C10 alkyl(meth)acrylates and at least one oligo(meth)acrylate which comprises nonacrylic C C double bonds and has a K value of less than or equal to 20. The hotmelt adhesive comprises a photoinitiator which may be present in the form of an additive not attached to the poly(meth)acrylate and/or not attached to the oligo(meth)acrylate, may be incorporated by copolymerization into the poly(meth)acrylate, and/or may be attached to the oligo(meth)acrylate. The hotmelt adhesive can be used for producing adhesive tapes.

19 Claims, No Drawings

HOTMELT ADHESIVE COMPRISING RADIATION-CROSSLINKABLE POLY(METH)ACRYLATE AND OLIGO(METH)ACRYLATE WITH NONACRYLIC C-C DOUBLE BONDS

The invention relates to a radiation-crosslinkable hotmelt adhesive comprising at least one radiation-crosslinkable poly(meth)acrylate, which is formed from C1 to C10 alkyl(meth)acrylates, and at least one oligo(meth)acrylate which contains nonacrylic C—C double bonds. The hotmelt adhesive comprises a photoinitiator and can be used for producing adhesive tapes.

Radiation-crosslinkable hotmelt adhesives are known from, for example, DE 102004058070, EP-A 246 848, EP-A 377 191, EP-A 445 641 or WO 01/23488. With pressure-sensitive adhesives (PSAs) there is a desire both for effective adhesion to the substrate and sufficient cohesion (internal strength). Radiation-curable PSAs, especially hotmelt PSAs free from water and solvent, generally have good adhesion. The cohesion can be enhanced by irradiation with high-energy light. The desired cohesion can be set by the type and duration of the irradiation. An advantage is that a hotmelt PSA with a defined chemical composition can be suitable for different uses depending on the level of cohesion set by the irradiation.

For certain applications, especially for highly cohesive adhesive tapes, however, the cohesion at room temperature or at elevated temperatures, such as at 70° C., for example, and, consequently, the shear strength, is still not sufficient after irradiation. A higher level of cohesion in hotmelt adhesives based on what are called acrylate hotmelts would be achievable theoretically by a greater number of polar groups in the acrylate polymers. However, at the customary coating temperature of 130° C., UV-curing acrylate hotmelts with higher fractions of polar groups (e.g., acrylic acid, vinylpyrrolidone, hydroxy ethyl acrylate, ureidomethacrylate, etc.) have a very high zero-shear viscosity, of more than 100 Pa s, whereas standard products with few or no polar groups typically only have zero-shear viscosities of less than 70 Pas. As a result of the high viscosity, however, the highly polar acrylate hotmelts cannot be used readily in a conventional coating operation. Viscosity-lowering additives such as plasticizers, resins, and low molecular mass blending polymers may lower the viscosity and enable coating, but they nevertheless destroy the desired cohesion again, even when used in small quantities, and also have an unfavorable effect on adhesion and on peel strengths, owing to commonplace instances of migration. Moreover, such additions are often excessively UV-absorbing or lead to hazing in the hotmelt, which may critically disrupt the UV crosslinking.

It is an object of the invention to provide a hotmelt adhesive with maximum cohesion in conjunction with minimum viscosity at the coating temperature, where the ingredients ought to be extremely thermally stable and the disadvantages identified above ought as far as possible to be avoided.

The object is achieved in accordance with the invention by means of a radiation-crosslinkable hotmelt adhesive comprising
  (A) at least one radiation-crosslinkable poly(meth)acrylate formed to an extent of at least 60% by weight of C1 to C18 alkyl(meth)acrylates and
  (B) at least one oligo(meth)acrylate which comprises one or more nonacrylic, olefinic C—C double bonds and has a K value of less than or equal to 20,
the hotmelt adhesive comprising at least one photoinitiator, the photoinitiator being present in the form of an additive not attached to the poly(meth)acrylate A and not attached to the oligo(meth)acrylate B, and/or the photoinitiator being incorporated by copolymerization into the poly(meth)acrylate A, and/or the photoinitiator being attached to the oligo(meth)acrylate B.

In one embodiment the photoinitiator is exclusively in the form of an additive not attached to the poly(meth)acrylate A and not attached to the oligo(meth)acrylate B. In another embodiment the photoinitiator is exclusively in the form of a component incorporated by copolymerization into the poly(meth)acrylate A, and/or a component attached to the oligo(meth)acrylate B. In one embodiment the photoinitiator is present exclusively in the form of a component incorporated by copolymerization into the poly(meth)acrylate A.

In one embodiment the noncrosslinked poly(meth)acrylate A has a K value of at least 30 and/or the noncrosslinked poly(meth)acrylate A comprises no nonacrylic, olefinic C—C double bonds.

The term "radiation-crosslinkable" means that the hotmelt adhesive comprises at least one compound having at least one radiation-sensitive group, and a crosslinking reaction is induced on irradiation. The irradiation takes place preferably with actinic radiation, preferably UV light, more particularly UV-C radiation.

Hotmelt adhesives, also known as hotmelts or hot glues, are solvent-free products which are more or less solid at room temperature but can be applied in the hot state, owing to the accompanying reduction in viscosity, to a bonding area, and, on cooling, produce the adhesive bond; radiation-crosslinkable hotmelt adhesives can be irradiated as well.

In the text below, occasionally the term "(meth)acryl . . . " and similar terms are used as an abbreviated notation for "acryl . . . or methacryl . . . ".

In order to achieve a good viscosity-lowering effect in conjunction with high cohesion, the weight ratio of radiation-crosslinkable poly(meth)acrylate to oligo(meth)acrylate is preferably in the range from 99:1 to 50:50, more preferably from 95:5 to 75:25.

For radiation crosslinking, the hotmelt adhesive comprises a photoinitiator. The photoinitiator is preferably copolymerized in the poly(meth)acrylate A. It may also, however, be unattached and merely mixed with the polymer. Examples of typical photoinitiators that may be added as an additive to the polymer include acetophenone, benzoin ethers, benzyl dialkyl ketals or derivatives thereof. The amount of the admixed photoinitiator is preferably 0.05 to 10 parts by weight, more preferably 0.1 to 2 parts by weight, per 100 parts by weight of polymer A.

Through irradiation with high-energy light, more particularly UV light, the photoinitiator or photoinitiator group brings about crosslinking of the polymer and/or oligomer, preferably by means of a chemical grafting reaction of the photoinitiator group with a spatially adjacent polymer or oligomer chain. Crosslinking may be accomplished in particular by insertion of a carbonyl group of the photoinitiator into an adjacent C—H bond, with formation of a —C—C—O—H moiety. The wavelength range within which the photoinitiator group can be activated, i.e., in which the principal absorption band of the photoinitiator group is situated, is preferably 200 to 450 nm, more preferably 250 to 350 nm, very preferably 250 to 280 nm.

The hotmelt adhesive comprises preferably 0.0001 to 0.1 mol, more preferably 0.0002 to 0.1, very preferably 0.0003 to 0.01 mol of the photoinitiator, or of the molecular group that acts as a photoinitiator and is attached to the polymer and/or to the oligomer, per 100 g of hotmelt adhesive.

The radiation-crosslinkable poly(meth)acrylate may be an adhesive based on a polymer with copolymerized photoinitiator. The polymer may be prepared by free-radical polymerization of ethylenically unsaturated monomers, with copolymerization of at least one radiation-sensitive, radically polymerizable organic compound. Radiation-sensitive, free-radically polymerizable organic compounds are identified for short below as polymerizable photoinitiator. The polymerizable photoinitiator may be installed in the polymer chain of copolymers by means of free-radical copolymerization. Polymerizable photoinitiators preferably have the following fundamental construction:

A-X-B where A is a monovalent organic radical having preferably a phenone group as radiation-sensitive group,
X is an ester group selected from —O—C(=O)—, —(C=O)—O and —O—(C=O)—O—, and
B is a monovalent organic radical which comprises an ethylenically unsaturated, free-radically polymerizable group. Preferred radicals A are radicals which comprise at least one structural element derived from phenones, more particularly from acetophenones or benzophenones. Preferred radicals B comprise at least one, preferably precisely one, acrylic or methacrylic group.

The ethylenically unsaturated group may be attached directly to the group X. The radiation-sensitive group may also be attached directly to the group X. Alternatively there may be a spacer group located in each case between ethylenically unsaturated group and the group X or between radiation-sensitive group and group X. The spacer group may have, for example, a molecular weight of up to 500, more particularly up to 300 or 200 g/mole.

Suitable photoinitiators are, for example, compounds with acetophenone or benzophenone structural units, described for example in EP 377191 A or EP 1213306 A. One preferred group X is the carbonate group —O—(C=O)—O—. Preferred polymerizable photoinitiators are compounds of the formula F-1:

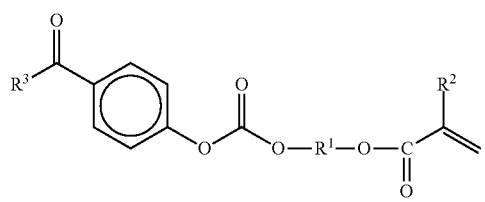

F-1 in which $R^1$ is an organic radical having up to 30 C atoms, $R^2$ is an H atom or a methyl group, and $R^3$ is a substituted or unsubstituted phenyl group or is a C1-C4 alkyl group. $R^1$ more preferably is an alkylene group, more particularly a C2-C8 alkylene group. $R^3$ more preferably is a methyl group or is a phenyl group, very preferably a phenyl group.

Further acetophenone and benzophenone derivatives suitable as copolymerizable photoinitiators are, for example, those of the formula F-2

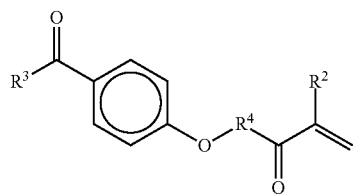

F-2 in which $R^2$ and $R^3$ can have the definition above and $R^4$ can be a single bond or (—CH2-CH2-O)n, where n is an integer from 1 to 12.

In the case of the copolymerized photoinitiator, the poly(meth)acrylate is formed preferably to an extent of 0.05% to 10% by weight or 0.05% to 5% by weight, more preferably 0.1% to 2% by weight or 0.1% to 1% by weight, of at least one ethylenically unsaturated copolymerizable compound having a photoinitiator group.

The irradiation-crosslinkable poly(meth)acrylate is formed to an extent of at least 60% by weight, preferably at least 80% by weight, of C1 to C18 alkyl(meth)acrylates. Preference is given to C1 to C10 alkyl(meth)acrylates, more particularly C1-C8 alkyl(meth)acrylates, e.g., methyl(meth)acrylate, ethyl acrylate, n-butyl acrylate, n-hexyl acrylate, 2-propyihexylacrylate and 2-ethylhexyl acrylate, and mixtures thereof.

In one embodiment of the invention the poly(meth)acrylate polymer consists to an extent of at least 80% by weight of at least one acrylate selected from the group consisting of n-butyl acrylate, n-hexyl acrylate, 2-ethylhexyl acrylate, 2-propylhexyl acrylate, and mixtures thereof, or the poly(meth)acrylate polymer consists to an extent of at least 90% by weight of 2-ethylhexyl acrylate.

The poly(meth)acrylate polymer may be formed from further, ethylenically unsaturated compounds as synthesis components, examples being vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and 1 or 2 double bonds, or mixtures of these monomers. Vinyl esters of carboxylic acids having 1 to 20 C atoms are, for example, vinyl laurate, vinyl stearate, vinyl propionate, Versatic acid vinyl esters, and vinyl acetate. Vinylaromatic compounds contemplated include, for example, vinyltoluene, alpha- and p-methylstyrene, alpha-butylstyrene, 4-n-butylstyrene, 4-n-decylstyrene, and, preferably, styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Vinyl ethers include, for example, vinyl methyl ether or vinyl isobutyl ether. Preference is given to vinyl ethers of alcohols comprising 1 to 4 C atoms. Hydrocarbons having 2 to 8 C atoms and two olefinic double bonds include butadiene, isoprene, and chloroprene. Further monomers contemplated include more particularly monomers having carboxylic, sulfonic or phosphonic acid groups. Carboxylic acid groups are preferred. Examples include acrylic acid, methacrylic acid, itaconic acid, maleic acid or fumaric acid. Further monomers are, for example, also (meth)acrylamide and monomers comprising hydroxyl groups, more particularly C1-C10 hydroxyalkyl(meth)acrylates. Mention may further be made of phenyloxyethylglycol mono(meth)acrylate, glycidyl acrylate, glycidyl methacrylate, amino(meth)acrylates such as 2-aminoethyl(meth)acrylate. Monomers which as well as the double bond also carry further functional groups, e.g., isocyanate-, amino-, hydroxyl-, amide- or glycidyl-, may have the effect, for example, of improving the adhesion to substrates.

The poly(meth)acrylate polymer is formed, in addition to the C1 to C18 alkyl(meth)acrylates, preferably from at least one monomer having polar groups. Monomers having polar groups are, for example, monomers in which the polar groups are selected from carboxylic acid groups, carboxylic anhydride groups, hydroxyl groups, ureido groups, pyrrolidone groups, amide groups, urethane groups, urea groups, piperidyl groups, piperazinyl groups, morpholinyl groups, imidazolyl groups, and combinations of two or more of said groups. Preferred monomers with carboxylic acid groups are acrylic acid and methacrylic acid. Preferred monomers with hydroxyl groups are C1-C10 hydroxyalkyl(meth)acrylates, more particularly hydroxyethyl(meth)acrylate and hydroxypropyl(meth)acrylate.

The monomers having polar groups preferably have a water solubility at 21° C. of more than 5 g/liter or more than 10 g/liter. The poly(meth)acrylate polymer is preferably formed to an extent of 0.1 to 30% by weight, more preferably of 0.5% to 25% by weight, or 1% to 15% by weight, of the monomers having polar groups.

In one embodiment the poly(meth)acrylate is formed from
(a1) at least 80% by weight of at least one acrylate selected from the group consisting of n-butyl acrylate, n-hexyl acrylate, 2-ethylhexyl acrylate, propylheptyl acrylate, and mixtures thereof, and
(a2) 1% to 15% by weight of at least one monomer having polar groups, the monomer being selected from the group consisting of carboxylic acid groups, carboxamide groups, pyrrolidone groups, urethane groups, and urea groups.

The glass transition temperature (Tg) of the radiation-crosslinkable polymer is preferably in the range from −60 to +10° C., more particularly in the range from −60 to 0° C., or from −55° C. to −10° C., more preferably from −55° C. to −20° C. The glass transition temperature can be determined by customary methods such as differential thermal analysis or differential scanning calorimetry (see, for example, ASTM 3418/82, midpoint temperature). The equation referred to as the Fox equation allows the skilled person to identify copolymers in the appropriate Tg range beforehand, and to prepare them specifically by appropriate variation in the nature and amount of the monomers. According to Fox (T. G. Fox, Bull. Am. Phys. Soc. 1956 [Ser. II] 1, page 123, and in accordance with Ullmann's Encyclopädie der technischen Chemie, vol. 19, page 18, 4th edition, Verlag Chemie, Weinheim, 1980), the glass transition temperature of copolymers with no more than low levels of crosslinking is given in good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures of the polymers synthesized in each case only from one of the monomers 1, 2, ... n, in degrees Kelvin. The $T_g$ values for the homopolymers of the majority of monomers are known and are listed in, for example, Ullmann's Encyclopedia of Industrial Chemistry, vol. A21, page 169, 5th edition, VCH Weinheim, 1992; further sources of homopolymer glass transition temperatures include, for example, J. Brandrup, E. H. Immergut, Polymer Handbook, 1st edition, J. Wiley, New York 1966, 2nd edition, J. Wiley, New York 1975, and 3rd edition, J. Wiley, New York 1989).

The radiation-crosslinkable polymer preferably has a K value of 30 to 80, more preferably of 40 to 60, as measured in tetrahydrofuran (1% strength solution, 21° C.). The K value of Fikentscher is a measure of the molecular weight and the viscosity of the polymer.

The oligo(meth)acrylates have one or more nonacrylic, olefinic C—C double bonds. They have a K value of less than or equal to 20, preferably of 10 to 20, as measured in tetrahydrofuran (1% strength solution, 21° C.).

The oligo(meth)acrylates are preferably composed to an extent of at least 40% by weight, more preferably at least 60% by weight, very preferably at least 80% by weight, of what are known as principal monomers. The principal monomers are selected from C1-C20 alkyl(meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and 1 or 2 double bonds, or mixtures of these monomers. Examples include (meth)acrylic acid alkyl esters having a C1-C10 alkyl radical, such as methyl methacrylate, methyl acrylate, n-butyl acrylate, ethyl acrylate and 2-ethylhexyl acrylate. Also suitable in particular are mixtures of the (meth)acrylic acid alkyl esters. Vinyl esters of carboxylic acids having 1 to 20 C atoms are, for example, vinyl laurate, vinyl stearate, vinyl propionate, Versatic acid vinyl esters, and vinyl acetate. Vinylaromatic compounds contemplated include vinyltoluene, alpha- and p-methylstyrene, alpha-butylstyrene, 4-n-butylstyrene, 4-n-decylstyrene, and, preferably, styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Examples of vinyl ethers include vinyl methyl ether or vinyl isobutyl ether. Preference is given to vinyl ethers of alcohols comprising 1 to 4 C atoms. Hydrocarbons having 2 to 8 C atoms and one or two olefinic double bonds include butadiene, isoprene, and chloroprene, ethylene or propylene. Preferred principal monomers are the C1 to C10 alkyl acrylates and methacrylates, more particularly C1 to C8 alkyl acrylates and methacrylates, with the acrylates being particularly preferred in each case. Especially preferred are methyl acrylate, ethyl acrylate, n-butyl acrylate, n-hexyl acrylate, octyl acrylate, and 2-ethylhexyl acrylate, and also mixtures of these monomers.

Besides the principal monomers, the oligo(meth)acrylates may comprise further monomers, examples being monomers having carboxylic acid, sulfonic acid or phosphonic acid groups. Carboxylic acid groups are preferred. Examples include acrylic acid, methacrylic acid, itaconic acid, maleic acid or fumaric acid. Further monomers are, for example, also monomers comprising hydroxyl groups, more particularly C1-C10 hydroxylalkyl(meth)acrylates, (meth)acrylamide, and monomers comprising ureido groups, such as ureido (meth)acrylates. As further monomers, mention may additionally be made of phenyloxyethylglycol mono(meth)acrylate, glycidyl acrylate, glycidyl methacrylate, and amino (meth)acrylates such as 2-aminoethyl(meth)acrylate. Also contemplated in particular are cyclic lactams such as N-vinylpyrrolidone or N-vinylcaprolactam.

The oligo(meth)acrylates are synthesized preferably to an extent of at least 40% by weight, more preferably at least 60% by weight, and very preferably at least 80% by weight, of C1 to C20 alkyl(meth)acrylates, more particularly the alkyl (meth)acrylates identified above.

A key feature of the oligo(meth)acrylate is that it comprises crosslinkable groups having nonacrylic, crosslinkable C—C double bonds (crosslinkable groups for short). Crosslinkable double bonds are more particularly those which are free-radically polymerizable with other double bonds (i.e., crosslinked by free-radical polymerization), or those which form free radicals as a result of elimination of a hydrogen atom (i.e., crosslinked by reactions of these free radicals). Crosslinkable groups contemplated include, for example, the allyl group, or cyclic hydrocarbon groups having at least one nonaromatic C—C double bond. In the case of the cyclic hydrocarbon group, the group more particularly is a dihydrodicyclopentadienyl group of the formula:

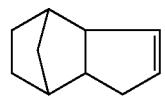

I

The crosslinkable group may be attached to the polymer in particular by copolymerization with monomers which comprise the crosslinkable group (crosslinkable monomers). Examples of suitable crosslinkable monomers include monomers which comprise a reactive ethylenically unsaturated group, necessary for the polymerization, and the above crosslinkable group. During the polymerization, the crosslinkable groups are at least partly conserved, since under the conditions of the polymerization it is first of all the more reactive ethylenically unsaturated group (e.g., an acrylic or methacrylic group) that undergoes polymerization. Monomers include allyl(meth)acrylate or monomers having a (meth)acrylic group and a dihydrodicyclopentadienyl group. The (meth)acrylic group may be attached directly or indirectly (i.e., by an organic group as spacer) to the dihydrodicyclopentadienyl group; preference is given to dihydrodicyclopentadienyl(meth)acrylate of the formulae:

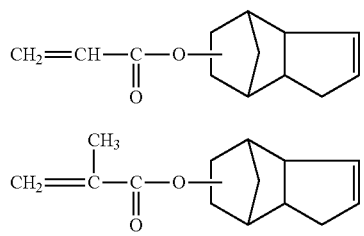

The oligo(meth)acrylate preferably has a crosslinkable groups content of 0.0001 to 0.5 mol/100 g of oligomer, or of 0.0002 to 0.1 or of 0.001 to 0.02 or of 0.003 to 0.01 mol/100 g of oligomer, more preferably of 0.005 to 0.25 mol/100 g of oligomer. The oligomer is preferably an oligomer which is crosslinkable by irradiation with high-energy light, e.g., UV light or electron beams. The oligomer is crosslinkable accordingly, for example, through above crosslinkable groups or else, if hydrogen atoms can be removed from the main polymer chain photochemically, including, in particular, with use of a photoinitiator or by means of electron beams, to form a free radical which is able to enter into further chemical reactions. The oligomer may further comprise one of the above-described photoinitiators in copolymerized form.

The oligo(meth)acrylate preferably has a zero-shear viscosity at 23° C. of less than 5000 Pa s, preferably less than 3000 Pa s, more preferably less than 1000 Pa s.

The poly(meth)acrylates and the oligo(meth)acrylates can be prepared by copolymerizing the monomeric components, optionally including the copolymerizable photoinitiator, using the customary polymerization initiators and also, optionally, regulators (chain transfer agents), with polymerization taking place at the customary temperatures in bulk, in emulsion, e.g., in water or liquid hydrocarbons, or in solution. The oligo(meth)acrylates are prepared in such a way as to ensure, by means of appropriate measures to limit the molecular weight, that their K value is less than or equal to 20.

The low molar masses are promoted particularly, for example, by the use of molecular weight regulators (chain transfer agents) or by the use of solvents that regulate the molecular weight, such as isopropanol or o-xylene. Polymerizations at temperatures above 100° C. and/or at low solids contents are also suitable. Alternatively it is also possible for oligo(meth)acrylates to be obtained by high-temperature bulk polymerization under pressure, as is described in WO 03/066704.

The poly(meth)acrylates and the oligo(meth)acrylates are preferably prepared either by emulsion polymerization in water or by polymerization of the monomers in organic solvents, more particularly in organic solvents with a boiling range of 50 to 150° C., preferably of 60 to 120° C., using the customary amounts of polymerization initiators, generally 0.01% to 10%, more particularly 0.1 to 4%, by weight, based on the overall weight of the monomers. The polymers can be prepared at temperatures of 20 to 150° C., preferably at temperatures in the range from 70 to 120° C., and at pressures of 0.1 to 100 bar (absolute), preferably at 0.3 to 10 bar, in the presence of 0.01% to 10% by weight of peroxides or azo initiators, as polymerization initiators, based on the monomers, and in the presence of 0% to 200% by weight of inert solvents, preferably 5% to 25% by weight, based on the monomers, i.e. by solution polymerization or bulk polymerization. The reaction takes place preferably within an increasing vacuum, as for example by lowering of the pressure from atmospheric pressure (1 bar) to 500 mbar (absolute). Solvents are, for example, hydrocarbons, alcohols such as methanol, ethanol, propanol, butanol, isobutanol, ketones such as acetone, methyl ethyl ketone, methyl isobutyl ketone, ethyl acetate, nitriles such as acetonitrile and benzonitrile, or mixtures of the solvents stated. In one preferred embodiment the solvents for the polymerization are one or more ketones having a boiling point of below 150° C. under atmospheric pressure (1 bar).

Examples of polymerization initiators contemplated include azo compounds, ketone peroxides, and alkyl peroxides, examples being acyl peroxides such as benzoyl peroxide, dilauroyl peroxide, didecanoyl peroxide, isononanoyl peroxide, alkyl esters such as tert-butyl perpivalate, tert-butyl per-2-ethylhexanoate, tert-butyl permaleate, tert-butyl perisononanoate, tert-butyl perbenzoate, tert-amyl per-2-ethylhexanoate, dialkyl peroxides such as dicumyl peroxide, tert-butyl cumyl peroxide, di-tert-butyl peroxide, and peroxodicarbonates. As initiators it is additionally possible for use to be made of azo initiators such as, for example, 2,2'-azobisisobutyronitrile, 2,2'-azobis(methyl isobutyrate) or 2,2'-azobis(2,4-dimethylvaleronitrile).

For the conduct of the polymerization, particularly for preparing the oligomers, it is also possible for the reaction mixture to be admixed with what are called polymerization regulators, these being compounds which lower the degree of polymerization, which are added, for example, in amounts of 0.1 to 0.8 part by weight, based on 100 parts by weight of the monomers to be polymerized. Suitable examples include compounds having a thiol group, examples being mercaptans such as mercaptoethanol, tert-butyl mercaptan, mercaptosuccinic acid, ethylhexyl thioglycolate, 3-mercaptopropyltrimethoxysilane or dodecylmercaptan.

Following the polymerization in solution, the solvents may optionally be separated off under reduced pressure, an operation which is conducted at elevated temperatures, as for example in the range from 100 to 150° C. The polymers can then be used in the solvent-free state (solvent content preferably less than 2% by weight, based on the overall composition), i.e., in the form of melts.

The hotmelt adhesive of the invention preferably has a zero-shear viscosity at 130° C. of less than 100 Pa s. It is used in solvent-free, meltable form. Solvent from the preparation process can be removed beforehand by suitable methods, preferably to a residual level of less than 0.5% by weight, based on the solids content.

For producing the coatings, the hotmelt PSAs are applied as a melt to the materials that are to be coated, examples being substrates for adhesive tapes or labels, the surface being coated at least partly with an adhesive of the invention. The hotmelt PSA may be applied in the form of a melt, i.e., in general, at temperatures from 50 to 160° C., preferably 80 to 150° C. The PSA application rate is preferably from 10 to 100 g/m², more preferably from 20 to 70 g/m². Coat thicknesses are, for example, 2 to 100 micrometers, preferably 10 to 80 or 20 to 70 micrometers.

Carriers contemplated include paper or polymer films, made of polyester, polyolefins, more particularly polyethylene or polypropylene, PVC, cellulose or polyacetate, for example.

Following application to the carriers, the hotmelt adhesive of the invention is irradiated with high-energy radiation, preferably UV light, more particularly UV-C radiation (200-280 nm), to produce crosslinking. For this purpose, generally speaking, the coated substrates are placed on a conveyor belt and the belt is conveyed past a radiation source, such as a UV lamp. The degree of crosslinking of the polymers is dependent on the duration and intensity of the irradiation. The radiation energy preferably totals 100 to 1500 mJ/cm² of irradiated surface area. As UV sources it is possible to use the customary sources, examples being medium-pressure mercury lamps with a radiation output of 80 to 240 watts/cm.

For producing pressure-sensitive adhesive labels, the PSA may for example also be applied by transfer application to carriers such as paper or polymer films, by first being applied to abhesively coated carrier materials, such as siliconized paper, and irradiated, and then laminated, for example, onto paper. Following the removal of the siliconized paper, the pressure-sensitively adhesive layer may optionally be irradiated again. The pressure-sensitive adhesive materials can be converted and/or modified in a form which is customary per se.

In this way it is possible to produce adhesive articles, especially adhesive articles having pressure-sensitively adhesive properties. The hotmelt adhesive of the invention is a material which, particularly after crosslinking by irradiation, has pressure-sensitive adhesive properties. A PSA (pressure-sensitive adhesive) is a viscoelastic adhesive whose set film at room temperature (20° C.) in the dry state remains permanently tacky and adhesive.

Preferred adhesive articles are adhesive labels, adhesive tapes, and self-adhesive films. Adhesive tapes are particularly preferred. The invention therefore also provides adhesive tapes which on one or both sides of a tapelike carrier material have a coating comprising a radiation-crosslinked hotmelt adhesive of the invention. The carrier material in this case is preferably selected from polyethylene, polypropylene, cellulose, polyacetate, and polyester.

The hotmelt adhesives of the invention are distinguished by the fact that, on account of the polar groups, they exhibit a high level of adhesion to the substrate surfaces and, prior to irradiation, can be applied effectively to carrier materials, owing to the plasticizing, viscosity-lowering effect of the oligomers, but following irradiation, the oligomers largely lose their negatively influencing effect on the cohesion, as a result of grafting reactions and/or crosslinking reactions, and the irradiated layers of adhesive therefore possess a high level of cohesion.

EXAMPLES

Example P1

High-Viscosity Base Polymer

A polymerization apparatus consisting of glass reactor, reflux condenser, stirrer, and nitrogen inlet is charged under a gentle nitrogen stream with 180 g of methyl ethyl ketone (MEK), and this initial charge is heated to 80° C. 50 g are added of a monomer mixture consisting of 897 g of 2-ethylhexyl acrylate, 100 g of acrylic acid, and 8.57 g of photoinitiator of the formula F-1 (35% strength in o-xylene). When 80° C. are regained, 2.65 g of an initiator solution comprising 8 g of tert-butyl perpivalate (75% strength in mineral oil) and 45 g of MEK are added, and initial polymerization takes place for 3 minutes. Then the remaining 955 g of monomer mixture and 50.3 g of initiator solution are run in over 3 hours. The temperature is subsequently raised to 90° C. and a solution of 2.67 g of tert-butyl perpivalate (75% strength in mineral oil) in 21.7 g of MEK is added over 30 minutes. Reduced pressure is applied thereafter, and the solvent is distilled off at a maximum of 135° C. and less than 50 mbar. This is followed, still with slow stirring, by degassing under reduced pressure at 135° C. for 1 hour.

K value; 1% in THF: 43.1
zero-shear viscosity at 130° C.: 150 Pas

Example P2

High-Viscosity Base Polymer

A polymerization apparatus consisting of glass reactor, reflux condenser, stirrer, and nitrogen inlet is charged under a gentle nitrogen stream with 307.4 g of MEK, and this initial charge is heated to 80° C. 85.8 g are added of a monomer mixture consisting of 1521.5 g of 2-ethylhexyl acrylate, 170 g of acrylic acid, and 24.29 g of photoinitiator of the formula F-1 (35% strength in o-xylene). When 80° C. are regained, 4.51 g of an initiator solution comprising 13.6 g of tert-butyl perpivalate (75% strength in mineral oil) and 76.5 g of MEK are added, and initial polymerization takes place for 3 minutes. Then the remaining 1630 g of monomer mixture and 85.6 g of initiator solution are run in over 2 hours 45 minutes. The temperature is subsequently raised to 90° C. and a solution of 4.53 g of tert-butyl perpivalate (75% strength in mineral oil) in 36.9 g of MEK is added over 30 minutes. Reduced pressure is applied thereafter, and the solvent is distilled off at a maximum of 135° C. and less than 50 mbar. This is followed, still with slow stirring, by degassing under reduced pressure at 135° C. for 1 hour.

K value; 1% in THF: 42.7
zero-shear viscosity at 130° C.: 136 Pas

Example O3

Acrylate Copolymer with Double Bonds

A polymerization apparatus consisting of glass reactor, reflux condenser, stirrer, and nitrogen inlet is charged under a gentle nitrogen stream with 300 g of isopropanol, and this initial charge is heated to 80° C. 57 g are added of a monomer mixture consisting of 680.00 g of ethylhexyl acrylate, 80.00 g of acrylic acid, 40.00 g of allyl methacrylate, and 240.00 g of isopropanol. When 80° C. are regained, 8.57 g of an initiator solution comprising 21.33 g of tert-butyl perpivalate (75% strength in mineral oil) and 150.00 g of isopropanol are added, and initial polymerization takes place for 3 minutes. Then the remaining 988 g of monomer mixture and 162.7 g of initiator solution are run in over 3 hours. The temperature is subsequently raised to 90° C. and a solution of 2.67 g of tert-butyl perpivalate (75% strength in mineral oil) in 24 g of isopropanol is added over 30 minutes. Reduced pressure is applied thereafter, and the solvent is distilled off at a maximum of 135° C. and less than 50 mbar. This is followed, still with slow stirring, by degassing under reduced pressure at 135° C. for 1 hour.

K value; 1% in THF: 16
zero-shear viscosity at 130° C.: 2.6 Pas

Example O4

Acrylate Copolymer with Double Bonds

A polymerization apparatus consisting of glass reactor, reflux condenser, stirrer, and nitrogen inlet is charged under a gentle nitrogen stream with 437.5 g of isopropanol, and this initial charge is heated to 80° C. 35 g are added of a monomer mixture consisting of 245 g of ethylhexyl acrylate, 35 g of acrylic acid, and 70 g of dicyclopentadienyl acrylate (DCPA), and 350 g of isopropanol. When 80° C. are regained, 4.67 g of an initiator solution comprising 4.67 g of tert-butyl perpivalate (75% strength in mineral oil) and 42 g of isopropanol are added, and initial polymerization takes place for 3 minutes. Then the remaining 665 g of monomer mixture and 42 g of initiator solution are run in over 2 hours 45 minutes. The temperature is subsequently raised to 90° C. and a solution of 0.93 g of tert-butyl perpivalate (75% strength in mineral oil) in 28 g of isopropanol is added over 30 minutes. Reduced pressure is applied thereafter, and the solvent is distilled off at a maximum of 135° C. and less than 50 mbar. This is followed, still with slow stirring, by degassing under reduced pressure at 135° C. for 1 hour.

K value; 1% in THF: 12.5 zero-shear viscosity at 23° C.: 3878 Pas

Example O5

Acrylate Copolymer with Double Bonds

A polymerization apparatus consisting of glass reactor, reflux condenser, stirrer, and nitrogen inlet is charged under a gentle nitrogen stream with 378 g of isopropanol, and this initial charge is heated to 80° C. 25 g are added of a monomer mixture consisting of 375 g of n-butyl acrylate, 25 g of acrylic acid, and 100 g of DCPA. When 80° C. are regained, 10.2 g of an initiator solution comprising 13.33 g of tert-butyl perpivalate (75% strength in mineral oil) and 88.6 g of isopropanol are added, and initial polymerization takes place for 3 minutes. Then the remaining 475 g of monomer mixture and 91.7 g of initiator solution are run in over 2 hours 45 minutes. The temperature is subsequently raised to 90° C. and a solution of 1.33 g of tert-butyl perpivalate (75% strength in mineral oil) in 40 g of isopropanol is added over 30 minutes. Reduced pressure is applied thereafter, and the solvent is distilled off at a maximum of 135° C. and less than 50 mbar. This is followed, still with slow stirring, by degassing under reduced pressure at 135° C. for 1 hour.

K value; 1% in THF: 14.6 zero-shear viscosity at 23° C.: 2137 Pas

Example O6

Acrylate Copolymer with Double Bonds

A polymerization apparatus consisting of glass reactor, reflux condenser, stirrer, and nitrogen inlet is charged under a gentle nitrogen stream with 437.5 g of isopropanol, and this initial charge is heated to 80° C. 35 g are added of a monomer mixture consisting of 245 g of ethylhexyl acrylate, 35 g of acrylic acid, 70 g of DCPA, and 350 g of isopropanol. When 80° C. are regained, 7.1 g of an initiator solution comprising 9.33 g of tert-butyl perpivalate (75% strength in mineral oil) and 62 g of isopropanol are added, and initial polymerization takes place for 3 minutes. Then the remaining 665 g of monomer mixture and 64.2 g of initiator solution are run in over 2 hours 45 minutes. The temperature is subsequently raised to 90° C. and a solution of 0.93 g of tert-butyl perpivalate (75% strength in mineral oil) in 28 g of isopropanol is added over 30 minutes. Reduced pressure is applied thereafter, and the solvent is distilled off at a maximum of 135° C. and less than 50 mbar. This is followed, still with slow stirring, by degassing under reduced pressure at 135° C. for 1 hour.

K value; 1% in THF: 11.1 zero-shear viscosity at 23° C.: 647 Pas

Example O7

Acrylate Copolymer with Double Bonds

A polymerization apparatus consisting of glass reactor, reflux condenser, stirrer, and nitrogen inlet is charged under a gentle nitrogen stream with 1060 g of isopropanol, and this initial charge is heated to 80° C. 25 g are added of a monomer mixture consisting of 375 g of n-butyl acrylate, 25 g of acrylic acid, and 100 g of DCPA. When 80° C. are regained, 10.2 g of an initiator solution comprising 13.33 g of tert-butyl perpivalate (75% strength in mineral oil) and 88.6 g of isopropanol are added, and initial polymerization takes place for 3 minutes. Then the remaining 475 g of monomer mixture and 91.7 g of initiator solution are run in over 2 hours 45 minutes. The temperature is subsequently raised to 90° C. and a solution of 1.33 g of tert-butyl perpivalate (75% strength in mineral oil) in 40 g of isopropanol is added over 30 minutes. Reduced pressure is applied thereafter, and the solvent is distilled off at a maximum of 135° C. and less than 50 mbar. This is followed, still with slow stirring, by degassing under reduced pressure at 135° C. for 1 hour.

K value; 1% in THF: 10.9 zero-shear viscosity at 23° C.: 241 Pas

Example O8

A polymerization apparatus consisting of glass reactor, reflux condenser, stirrer, and nitrogen inlet is charged under a gentle nitrogen stream with 300 g of isopropanol, and this initial charge is heated to 80° C. 53 g are added of a monomer mixture consisting of 672 g of ethylhexyl acrylate, 80.00 g of acrylic acid, 40.00 g of allyl methacrylate, 22.86 g of photoinitiator monomer of the formula F-1 (35% strength in o-xylene), and 240.00 g of isopropanol. When 80° C. are regained, 8.57 g of an initiator solution comprising 21.33 g of tert-butyl perpivalate (75% strength in mineral oil) and 150.00 g of isopropanol are added, and initial polymerization takes place for 3 minutes. Then the remaining 1002 g of monomer mixture and 162.7 g of initiator solution are run in over 3 hours. The temperature is subsequently raised to 90° C. and a solution of 2.67 g of tert-butyl perpivalate (75% strength in mineral oil) in 24 g of isopropanol is added over 30 minutes. Reduced pressure is applied thereafter, and the solvent is distilled off at a maximum of 135° C. and less than 50 mbar. This is followed, still with slow stirring, by degassing under reduced pressure at 135° C. for 1 hour.

K value; 1% in THF: 11.7 zero-shear viscosity at 130° C.: 0.5 Pas

Example O9

A polymerization apparatus consisting of glass reactor, reflux condenser, stirrer, and nitrogen inlet is charged under a gentle nitrogen stream with 437.5 g of isopropanol, and this initial charge is heated to 80° C. 35 g are added of a monomer mixture consisting of 241 g of ethylhexyl acrylate, 35 g of acrylic acid, 70 g of DCPA, 10 g of photoinitiator monomer of the formula F-1 (35% strength in o-xylene), and 350 g of isopropanol. When 80° C. are regained, 4.67 g of an initiator solution comprising 4.67 g of tert-butyl perpivalate (75% strength in mineral oil) and 42 g of isopropanol are added, and initial polymerization takes place for 3 minutes. Then the remaining 671 g of monomer mixture and 42 g of initiator solution are run over 2 hours 45 minutes. The temperature is subsequently raised to 90° C. and a solution of 0.93 g of ten-butyl perpivalate (75% strength in mineral oil) in 28 g of isopropanol is added over 30 minutes. Reduced pressure is applied thereafter, and the solvent is distilled off at a maximum of 135° C. and less than 50 mbar. This is followed, still with slow stirring, by degassing under reduced pressure at 135° C. for 1 hour.

K value; 1% in THF: 14.8 zero-shear viscosity at 23° C.: 1413 Pas

Example O10

A polymerization apparatus consisting of glass reactor, reflux condenser, stirrer, and nitrogen inlet is charged under a gentle nitrogen stream with 378.8 g of isopropanol, and this initial charge is heated to 80° C. 25 g are added of a monomer mixture consisting of 450 g of n-butyl acrylate, 25 g of acrylic acid, and 25 g of allyl methacrylate. When 80° C. are regained, 10.19 g of an initiator solution comprising 13.3 g of tert-butyl perpivalate (75% strength in mineral oil) and 88.6 g of isopropanol are added, and initial polymerization takes place for 3 minutes. Then the remaining 475 g of monomer mixture and 91.7 g of initiator solution are run in over 2 hours 45 minutes. The temperature is subsequently raised to 90° C. and a solution of 1.33 g of tert-butyl perpivalate (75% strength in mineral oil) in 40 g of isopropanol is added over 30 minutes. Reduced pressure is applied thereafter, and the solvent is distilled off at a maximum of 135° C. and less than 50 mbar. This is followed, still with slow stirring, by degassing under reduced pressure at 135° C. for 1 hour.

K value; 1% in THF: 16.2 zero-shear viscosity at 23° C.: 430 Pas

Example P11

High-Viscosity Base Polymer

A polymerization apparatus consisting of glass reactor, reflux condenser, stirrer, and nitrogen inlet is charged under a gentle nitrogen stream with 362.35 g of MEK, and this initial charge is heated to 80° C. 100.9 g are added of a monomer mixture consisting of 1690 g of n-butyl acrylate, 100 g of acrylic acid, 200 g of N-vinylpyrrolidone, and 28.6 g of photoinitiator monomer of the formula F-1 (35% strength in o-xylene). When 80° C. are regained, 4.78 g of an initiator solution comprising 21.6 g of tert-butyl perpivalate (75% strength in mineral oil) and 74 g of MEK are added, and initial polymerization takes place for 3 minutes. Then the remaining 1917.6 g of monomer mixture and 48.7 g of initiator solution are run in over 3 hours. The temperature is subsequently raised to 90° C. and a solution of 5.33 g of tert-butyl perpivalate (75% strength in mineral oil) in 43.4 g of MEK is added over 30 minutes. Reduced pressure is applied thereafter, and the solvent is distilled off at a maximum of 135° C. and less than 50 mbar. This is followed, still with slow stirring, by degassing under reduced pressure at 135° C. for 1 hour.

K value; 1% in THF: 42.9 zero-shear viscosity at 130° C.: 112 Pas

Example 12

80 parts of the polymer from example P2 are mixed with 20 parts of the oligomer from example O8. The zero-shear viscosity (130° C.) is 64 Pas.

Example 13

80 parts of the polymer from example P2 are mixed with 20 parts of the oligomer from example O4. The zero-shear viscosity (130° C.) is 79 Pas.

Example 14

80 parts of the polymer from example P2 are mixed with 20 parts of the oligomer from example O3. The zero-shear viscosity (130° C.) is 65.5 Pas.

Example 15

80 parts of the polymer from example P2 are mixed with 20 parts of the oligomer from example O9. The zero-shear viscosity (130° C.) is 65.6 Pas.

Example 16

85 parts of the polymer from example P11 are mixed with 15 parts of the oligomer from example O10. The zero-shear viscosity at 130° C. is 73 Pas.

Comparative Example C1

90 parts of the polymer from example P1 are reduced in viscosity by mixing with 10 parts of the polymer plasticizer Palamoll 632. The zero-shear viscosity (130° C.) is 84 Pas.

Comparative Example C2

84.6 parts of the polymer from example P2 are reduced in viscosity by mixing with 15.4 parts of Palamoll® 632. The zero-shear viscosity at 130° C. is 84 Pas.

Measurement of the Adhesive Bonding Values

The resins were applied to a siliconized paper in an amount of 60 g/m$^2$, using a coating table heated to 110° C. Thereafter the coated papers were irradiated with UV light (H spectrum; Hg medium-pressure, 120 W/cm, UV-C dose 65 mJ/cm$^2$). The irradiated material was then transferred onto a polyester film (Hostaphan® RN 36).

The Following Tests Were then Carried Out:

The PSA-coated carrier was slit into test strips 25 mm wide. For determination of the shear strength (cohesion), the test strips were bonded with a bonded area of 25 mm$^2$ to the steel test surface (Afera steel), rolled on once with a roller weighing 1 kg, stored for 10 minutes (under standard conditions, 50% relative humidity, 1 bar, 23° C.), and then loaded in suspension with a 1 kg weight (under standard conditions). The measure of the shear strength is the time taken for the weight to fall off. The average was calculated in each case from 5 measurements.

For the determination of the peel strength (adhesion), a test strip 2.5 cm wide in each case was adhered to the steel test surface and rolled on once with a roller weighing 1 kg. It was then clamped by one end into the upper jaws of a tensile strain testing apparatus. The adhesive strip was peeled from the test surface at a 180° angle and at 300 mm/min—that is, the adhesive strip was bent round and peeled off parallel to the metal test panel, with the force needed to accomplish this being recorded. The measure of the peel strength is the force in N/2.5 cm which results as the average value from five measurements. The peel strength was determined 24 hours after bonding. After this time, the bond strength has developed fully.

Measurement of the Zero-Shear Viscosity

The zero-shear viscosity is the limiting value of the viscosity function at infinitely low shear rates. It is measured using an Anton Paar MCR 100 Rheometer (US 200 evaluation software) in plate/plate geometry. The samples are measured in oscillatory shear at a low shearing amplitude of 10%. Temperature is 130° C. (or as specified), circular frequency ramp log 100-0.1 1/s, measuring slot 0.5 mm, evaluation by Carreau-Gahleitner I, die diameter 25 mm.

TABLE 1

Adhesive bonding values

| Example | Zero-shear viscosity at 130° C. [Pa s] | Shear strength [min] | Peel strength [N/25 mm] |
|---|---|---|---|
| P2 (no oligomer) | 136 | 394 | 14.5 |
| C2 (P2 + Palamoll) | 84 | 243 | 17.0 |
| Example 12 (P2 + O8) | 64 | 493 | 17.7 |
| Example 13 (P2 + O4) | 79 | 579 | 18.5 |
| Example 14 (P2 + O3) | 66 | 480 | 14.5 |
| Example 15 (P2 + O9) | 66 | 687 | 16.6 |

The inventive examples 12-15 show that adding the oligomer allows the zero-shear viscosity at 130° C. to be lowered, with the shear strength being not adversely affected, and even enhanced. While the addition of conventional polymeric plasticizers does produce a desired reduction in the zero-shear viscosity, it results in a deterioration in the shear strength.

The invention claimed is:

1. A crosslinkable hotmelt adhesive comprising
a radiation-crosslinkable poly(meth)acrylate comprising at least 60% by weight of $C_1$ to $C_{18}$ alkyl(meth)acrylates,
an oligo(meth)acrylate which comprises from 0.0001 to 0.5 mol/100 g of at least one crosslinkable group selected from an allyl group and a cyclic hydrocarbon group having at least one nonaromatic C—C double bond-and has a K value of less than or equal to 20, and
a photoinitiator present in at least one form of (i) not being attached to the poly(meth)acrylate or the oligo(meth)acrylate, (ii) being incorporated as a copolymerized photoinitiator by copolymerization into the poly(meth)acrylate, and (iii) being attached to the oligo(meth)acrylate.

2. The hotmelt adhesive according to claim 1, wherein the photoinitiator is exclusively incorporated by copolymerization into the poly(meth)acrylate.

3. The hotmelt adhesive according to claim 1, wherein the poly(meth)acrylate, before crosslinking, possesses at least one property of having a K value of at least 30 and comprising no nonacrylic, olefinic C—C double bonds, and optionally, the oligo(meth)acrylate has a K value of from 10 to 20.

4. The hotmelt adhesive according to claim 1, wherein the poly(meth)acrylate before crosslinking has a glass transition temperature of from −60 to +10° C.

5. The hotmelt adhesive according to claim 1, wherein the poly(meth)acrylate is crosslinkable by irradiation with UV light.

6. The hotmelt adhesive according claim 1, wherein the copolymerized photoinitiator is copolymerized into the poly(meth)acrylate in a form of an ethylenically unsaturated copolymerizable photoinitiator in an amount of from 0.05 to 5% by weight.

7. The hotmelt adhesive according to claim 1, wherein the photoinitiator in a noncopolymerized form is represented in a formula A-X-B, wherein:

A is a monovalent organic radical comprising a phenone group,
X is an ester group selected from the group consisting of —O—C(=O)—, —(C=O)—O and —O—(C=O)—O—, and
B is a monovalent organic radical comprising an ethylenically unsaturated, free-radically polymerizable group.

8. The hotmelt adhesive according to claim 7, wherein the photoinitiator in the noncopolymerized form has a structure

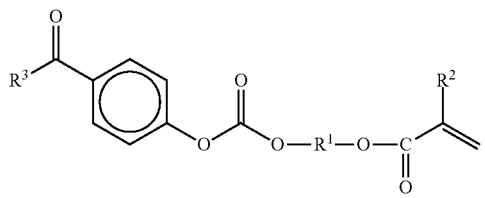

wherein:
$R^1$ is a divalent organic radical comprising up to 30 C atoms,
$R^2$ is an H atom or a methyl group, and
$R^3$ is a substituted or unsubstituted phenyl group or a $C_1$-$C_4$ alkyl group.

9. The hotmelt adhesive according to claim 1, wherein the poly(meth)acrylate is obtained from a process comprising: polymerizing at least one monomer comprising a polar group, wherein the polar group is at least one selected from the group consisting of a carboxylic acid group, a carboxylic anhydride group, a hydroxyl group, a ureido group, a pyrrolidone group, an amide group, a urethane group, a urea group, a piperidyl group, a piperazinyl group, a morpholinyl group, and an imidazolyl group.

10. The hotmelt adhesive according to claim 9, wherein the poly(meth)acrylate comprises from 0.1 to 30% by weight, of the at least one monomer comprising a polar group.

11. The hotmelt adhesive according to claim 1, wherein the poly(meth)acrylate comprises at least 80% by weight of at least one acrylate selected from the group consisting of n-butyl acrylate, n-hexyl acrylate, 2-ethylhexyl acrylate, and propylheptyl acrylate and
from 1% to 15% by weight of monomers comprising a polar group selected from the group consisting of a carboxylic acid group, a carboxamide group, a pyrrolidone group, a urethane group, and a urea group.

12. The hotmelt adhesive according to claim 1, wherein the oligo(meth)acrylate is obtained from a process comprising: reacting at least 40% by weight of $C_1$ to $C_{20}$ alkyl(meth)acrylates with at least one of said crosslinkable group.

13. The hotmelt adhesive according to claim 12, wherein said crosslinkable group is selected from the group consisting of allyl(meth)acrylate, and a monomer comprising a dihydrodicyclopentadienyl group.

14. The hotmelt adhesive according to claim 1, wherein the oligo(meth)acrylate comprises from 0.0002 to 0.1 mol/100 g of said crosslinkable groups.

15. The hotmelt adhesive according to claim 1, wherein the oligo(meth)acrylate has a zero-shear viscosity at 130° C. of less than 100 Pa s, a zero-shear viscosity at 23° C. of less than 5000 Pa s, or both.

16. The hotmelt adhesive according to claim 1, wherein a weight ratio of the poly(meth)acrylate to the oligo(meth)acrylate is from 99:1 to 50:50.

17. An adhesive tape comprising:
a carrier material, and
a coating comprising the hotmelt adhesive according to claim 1,
wherein the coating is present on one or both sides of the carrier material.

18. The adhesive tape according to claim 17, wherein the carrier material is selected from the group consisting of polyethylene, polypropylene, cellulose, polyacetate, and polyester.

19. A process for producing an adhesive tape, the process comprising:
introducing the hotmelt adhesive according to claim 1 into the adhesive tape.

* * * * *